July 11, 1939.   O. TWELE   2,165,736
ADVERTISING APPARATUS
Filed Jan. 14, 1937
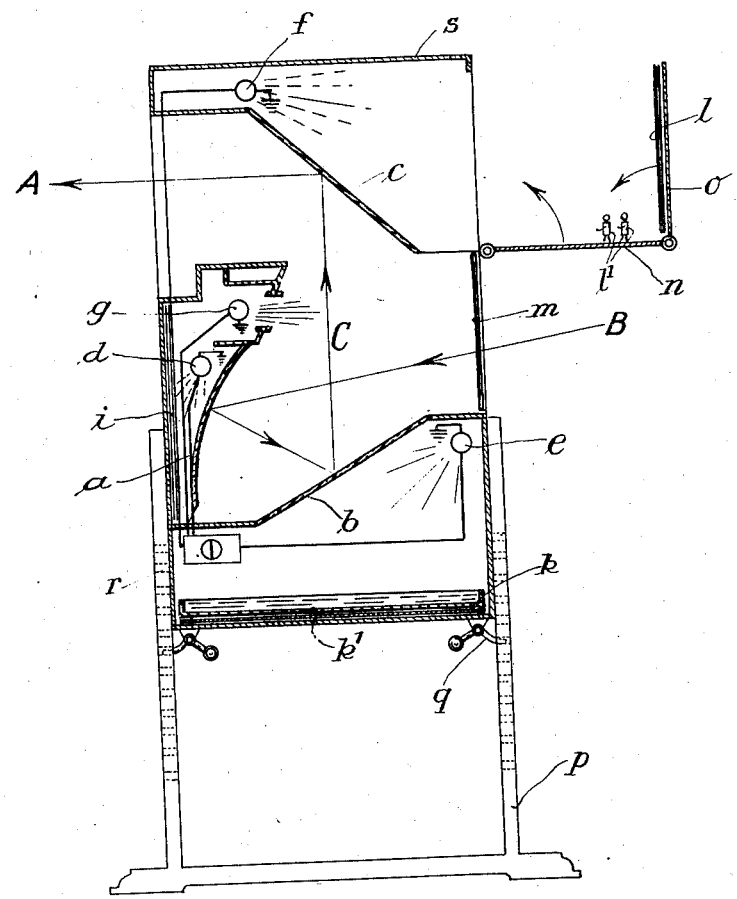
Inventor:
O. Twele
By: Glascock Downing & Seebold
Attys.

Patented July 11, 1939

2,165,736

UNITED STATES PATENT OFFICE 2,165,736

ADVERTISING APPARATUS

Otto Twele, Berlin, Germany

Application January 14, 1937, Serial No. 120,626
In Germany January 24, 1936

7 Claims. (Cl. 40—130)

This invention relates to apparatus for producing illusions, which are rendered visible primarily by means of a concave mirror and two further mirrors, and which are produced from living persons or the like. The persons or the like will hereinafter be briefly referred to as the object.

The arrangement of mirrors for such purposes has hitherto been such that a plane mirror served for the reception, while the reproduction was effected by means of a concave mirror. This gave rise to the disadvantage that the image appearing at the focus of the concave mirror only became visible without distortion at a distance of about 1 metre.

On this ground the advertising apparatus hitherto always had to be stationed at the appropriate distance from the observer, as a result of which the employment thereof in shops with a restricted depth of window space was out of the question.

With known appliances there was also the disadvantage that for the reception of persons or of pictures, plane mirrors had to be made comparatively large. The box for receiving the mirrors was therefore large and heavy.

The object of the present invention is to remove these disadvantages, more particularly by a novel arrangement of the mirrors.

According to the invention the reception of the object is effected by a concave mirror, while the transmission and reproduction thereof are effected by other mirrors, which may be plane mirrors. With this arrangement of the mirrors the observer need no longer be located so far from the apparatus as has hitherto been necessary. Furthermore the plane mirrors may be considerably smaller than hitherto.

The invention is diagrammatically illustrated in sectional elevation in the accompanying drawing.

In this drawing, A denotes the field of vision of the observer, B the object, and C the path of the rays of light. The rays emitted by the object are no longer received by a plane mirror but by a concave mirror $a$, transmitted to a plane mirror $b$ close beside it, and reflected by the latter to a further plane mirror $c$, which is visible to the observer A. The mirror image now visible, which reproduces the actions received on a greatly reduced scale, can be looked at from a point very close to the apparatus, thus enabling the apparatus to be erected for example in the immediate neighbourhood of the glass of a shop window. Moreover the mirrors may be comparatively small. A further disadvantage of the known methods and apparatus is also removed by the fact that the mirrors, which formerly had to be re-adjusted for every exhibition, are immovably adjusted with this apparatus at the appropriate angle of reflection to one another, as a result of which the apparatus is always ready for immediate use in any position and at any time without special mounting.

The plane and concave mirrors $a$, $b$ and $c$ employed in this apparatus are transparent if they are illuminated from the rear. Pictures, drawings, articles and the like which are arranged behind the mirrors then become visible through the mirrors as through a glass plate. The lamps serving for illumination are denoted in the drawing by $d$, $e$ and $f$. A lamp $g$ serves for illuminating the object B. The pictures, lantern slides, mirrors and so forth that can be erected behind the mirrors are denoted by $i$, $k$, $l$. According to the lighting of the individual lamps, therefore, the most varied images and backgrounds can be made visible, with or without a living object. If for example the lamp or series of lamps $f$ is lighted, the picture $l$ provided behind the plane mirror $c$ becomes directly visible to the observer A. The series of lamps $g$ illuminates a picture $m$, which may be located on the back wall, and which is transmitted by the concave mirror $a$ to the plane mirror $b$, and from there is reflected to the plane mirror $c$. Upon the series of lamps $d$ being lighted, the picture $i$ is transmitted by the transparent concave mirror $a$ to the plane mirror $b$, and likewise reflected from there to the plane mirror $c$. The series of lamps $e$ illuminates the picture $k$, which is reflected through the transparent plane mirror $b$ and likewise received by the plane mirror $c$.

Mechanical or electrical switching means may be associated with the apparatus for the purpose of actuating in succession at short intervals of time the contacts of the individual groups of lamps, so that when one series of lamps is extinguished, another is lighted and so forth. In this manner different images are constantly becoming visible in the plane mirror $c$. These images, if suitably drawn or painted, at the same time form backgrounds for the exhibition of living pictures, with the exception of course of the picture $m$, which has to be removed, from the back wall of the apparatus, together with a section of the latter, when moving pictures of the object B are to be exhibited.

Another important feature of the apparatus is that the wall $n$ is hingedly constructed and can be used as a table for plastic figures $l'$ or the like. A further wall $o$ is hinged to the wall $n$. The walls $n$ and $o$ can therefore be rocked in the direction of the arrows and folded together.

The lower portion of the apparatus, in which the picture $k$ is located, may advantageously be constructed as a water tank $k^1$ in which fishes or other living creatures can swim. These can then be rendered visible either by themselves or in conjunction with the living object B, by illuminating the mirror b, thus producing a highly comical effect.

The whole of the apparatus so far described is preferably lodged in a box-like frame s.

The whole apparatus is adjustably supported upon a stand p or the like. By means of locking levers q, which automatically enter positioning holes when the frame is raised, the apparatus is supported at an adjusted height.

r is the switch for the lamps.

What I claim is:

1. Advertising apparatus for exhibiting living pictures consisting of, a box-like frame with a transparent concave mirror on the inside of the front wall and opposite a rear opening in the box-like frame for the reception of the object to be reproduced, a lamp adapted to be switched on and off, a picture behind the concave mirror and visible when the lamp is switched on, a plane mirror arranged at an angle with respect to and in the vicinity of the concave mirror, and a further plane mirror arranged at an angle with respect to the first-named plane mirror and visible to the observer through a front sight opening in the box-like frame.

2. Advertising apparatus for exhibiting living pictures consisting of, a box-like frame with a transparent concave mirror on the inside of the front wall and opposite a rear opening in the box-like frame for the reception of the object to be reproduced, a lamp adapted to be switched on and off, a picture behind the concave mirror and visible when the lamp is switched on, a transparent plane mirror arranged at an angle with respect to and in the vicinity of the concave mirror, another lamp adapted to be switched on and off, a picture behind said plane mirror and visible when the second lamp is switched on, and a further plane mirror arranged at an angle with respect to the first-named plane mirror and visible to the observer through a front sight opening in the box-like frame.

3. Advertising apparatus for exhibiting living pictures consisting of, a box-like frame with a transparent concave mirror on the inside of the front wall and opposite a rear opening in the box-like frame for the reception of the object to be reproduced, a lamp adapted to be switched on and off, a picture behind the concave mirror and visible when the lamp is switched on, a transparent plane mirror arranged at an angle with respect to and in the vicinity of the concave mirror, another lamp adapted to be switched on and off, a picture behind said plane mirror and visible when the second lamp is switched on, a further plane mirror arranged at an angle with respect to the first-named plane mirror and visible to the observer through a front sight opening in the box-like frame, a third lamp adapted to be switched on and off and a picture behind said visible plane mirror and visible when the third lamp is switched on.

4. Advertising apparatus for exhibiting living pictures consisting of, a box-like frame with a transparent concave mirror on the inside of the front wall and opposite a rear opening in the box-like frame for the reception of the object to be reproduced, a lamp adapted to be switched on and off, a picture behind the concave mirror and visible when the lamp is switched on, a transparent plane mirror arranged at an angle with respect to and in the vicinity of the concave mirror, a second lamp adapted to be switched on and off, a picture behind said plane mirror and visible when the second lamp is switched on, a further transparent plane mirror visible to the observer through a front sight opening in the box-like frame, a third lamp adapted to be switched on and off, and a hinged table behind said visible plane mirror and visible when the third lamp is switched on.

5. Advertising apparatus for exhibiting living pictures consisting of, a box-like frame with a transparent concave mirror on the inside of the front wall and opposite a rear opening in the box-like frame for the reception of the object to be reproduced, a lamp adapted to be switched on and off, a picture behind the concave mirror and visible when the lamp is switched on, a transparent plane mirror arranged at an angle with respect to and in the vicinity of the concave mirror, a second lamp adapted to be switched on and off, a picture behind said plane mirror and visible when the second lamp is switched on, a further transparent plane mirror visible to the observer through a front sight opening in the box-like frame, a third lamp adapted to be switched on and off, a hinged table behind said visible plane mirror and visible when the third lamp is switched on, and a wall member pivoted to said table.

6. Advertising apparatus for exhibiting living pictures consisting of, a box-like frame with a transparent concave mirror on the inside of the front wall and opposite a rear opening in the box-like frame for the reception of the object to be reproduced, a lamp adapted to be switched on and off, a transparent plane mirror arranged at an angle with respect to and in the vicinity of the concave mirror, a second lamp adapted to be switched on and off, a tank below the plane mirror and visible when the second lamp is switched on, a further transparent plane mirror arranged at an angle with respect to the first-named plane mirror and visible to the observer through a front sight opening in the box-like frame, a third lamp adapted to be switched on and off, and a picture behind said visible plane mirror and visible when the third lamp is switched on.

7. Advertising apparatus for exhibiting living pictures consisting of, a box-like frame with a transparent concave mirror on the inside of the front wall and opposite a rear opening in the box-like frame for the reception of the object to be reproduced, a lamp, a picture behind the concave mirror and visible when the lamp is burning, a transparent plane mirror arranged at an angle with respect to and in the vicinity of the concave mirror, a second lamp, a picture behind said plane mirror and visible when the second lamp is burning, a further transparent plane mirror arranged at an angle with respect to the first-mentioned plane mirror and visible to the observer through a front sight opening in the box-like frame, a third lamp, a picture behind said visible plane mirror and visible when the third lamp is burning, and a switch for selectively lighting and extinguishing the lamps behind the mirrors.

OTTO TWELE.